Jan. 6, 1953 A. T. CENTANNI 2,624,663
COMPOSITION FOR TREATING PLANTS
Filed Aug. 28, 1947
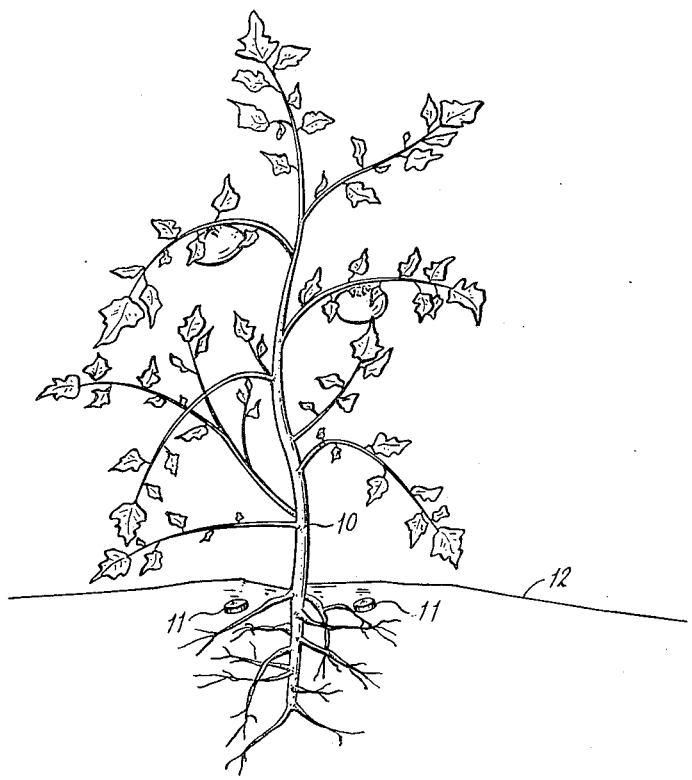
INVENTOR.
ANTHONY THOMAS CENTANNI
BY Joshua R. H. Potts
HIS ATTORNEY Patented Jan. 6, 1953

2,624,663

UNITED STATES PATENT OFFICE 2,624,663

COMPOSITION FOR TREATING PLANTS

Anthony Thomas Centanni, Philadelphia, Pa.

Application August 28, 1947, Serial No. 771,033

2 Claims. (Cl. 71—2.4)

The present invention relates to a composition for treating plants, and more particularly to a composition for aiding plant growth, and preventing wilt or blight, particularly in tomato plants.

A number of plants are subject to wilt or blight, including rotting in the presence of excess moisture. Tomato plants are particularly susceptible to these difficulties and particularly to a wilt or rot caused by unusually heavy rain when the tomato plant is young. The susceptibility of a plant to wilt or blight is undoubtedly related to the vigor of the plant. The present application is thus concerned primarily with a material which stimulates plant growth, and it is believed that this flourishing, vigorous growth will keep the plant free from wilt or blight, but it is also desired that the material used have antiseptic properties.

It is an object of the present invention to provide an improved composition for preventing wilt or blight in plants.

It is a further object of the present invention to provide an improved composition for treating tomato plants to prevent wilt or blight.

It is an object of the present invention to provide a method for treating plants to prevent wilt or blight.

These and other objects are attained by the present invention, which comprises a method and composition for treating plants, comprising applying thereto methenamine in a mildly alkaline plant nutrient medium.

For a full and more complete understanding of the invention, reference may be had to the following description and accompanying drawing wherein:

The figure is an illustration, somewhat diagrammatic, of a tomato plant with its roots embedded in the ground in close proximity to certain tablets in accordance with the precepts of this invention.

As illustrative of particular embodiments of the invention, the following formulations are given:

| | Parts |
|---|---|
| Methenamine | 5 |
| Sodium phosphate | 10 |
| Ammonium chloride | 1 |
| Iron ammonium citrate | ½ |

| | |
|---|---|
| Methenamine | 5 |
| Sodium phosphate | 10 |
| Ammonium chloride | 1 |
| Iron oxide | ¼ |

These compositions provide the two-fold purpose of promoting growth and preventing wilt or blight. A composition adapted to promote growth only might also prevent wilt or blight, since a sturdy plant is less susceptible to these attacks than a weaker one. However, the present composition not only strengthens the plant to prevent wilt or blight, but also is antiseptic and tends to destroy any wilt or blight that might be present.

For convenience in application, it is desirable that the compositions be prepared in the form of a tablet, and in the above compositions, if the given parts are grains, a conveniently sized tablet may be obtained. In treating a young tomato plant, two of these tablets may be used, one on each side of the stem of the plant, preferably about an inch under the surface of the soil, and an inch away from the stem on opposite sides thereof. This method is preferable and is illustrated in the accompanying drawing showing a tomato plant 10 with two tablets 11 in place below soil surface 12. It will be understood, of course, that the composition may be used in powdered or granular form and also in solution. For example, one tablet in a pint of water makes a spray which may be applied directly to the plant leaves or blossoms. Alternatively, plant seeds, such as tomato seeds, peach stones, etc. may be soaked in a solution of the composition prior to planting.

This composition has been successfully used to promote the growth of tomato plants, roses, orchids, potatoes, sweet pepper plants, petunias, cherries, and peaches.

The methenamine promotes the growth of the plant, as well as acting as an antiseptic. It should be applied in a mildly alkaline medium; that is, having a pH above seven, and preferably not above ten. Methenamine is normally a solid, and is not dangerously poisonous to human or animal life, and is compatible with the other ingredients of the composition in an aqueous solution. While for many reasons, methenamine is deemed to be the most desirable composition for the purpose, its obvious equivalents have some beneficial effect, particularly including its water soluble salts and derivatives. In the mildly alkaline medium, the methenamine is an active plant growth stimulant and, of course, it also has an antiseptic action.

When the composition of the present invention is placed in water, it may not be sufficiently alkaline, and a small amount of a mild alkali may be added, such as sodium carbonate, and this is particularly desirable if the water is of an acid nature. A sample of the first formation above gave a pH of 7.6 without the addition of alkali.

It will also be understood that the composition of the present invention may have further nutrient materials, plant hormones, or fillers added thereto. Fillers may be desirable if the material is used to dust the plant.

Sodium phosphate is a desirable nutrient, although ammonium or potassium phosphate can be used. Diabasic sodium phosphate is preferable.

The ammonium chloride is a readily available conditioner. The iron ammonium citrate is a desirable, easily assimilated form of iron, which is particularly important in preventing wilt or blight. While only a trace of iron is usually necessary to a plant, still if a plant develops an iron deficiency, chlorophyll formation in the plant cells slows down or ceases, and the plant suffers by a yellowing of the foliage. Other forms of iron can be used, such as iron oxide, but they are not so readily available to the plant.

It will, of course, be understood that details of the composition and method may be varied without departing from the principles of this invention, and it is not the purpose to limit the invention within the scope of the appended claims.

What is claimed is:

1. A composition of the character described for treating plants, comprising five parts methenamine, ten parts sodium phosphate, one part ammonium chloride, and one-fourth part iron oxide, said composition having a pH of seven plus.

2. A composition of the character described for treating plants, comprising five parts methenamine, ten parts sodium phosphate, one part ammonium chloride, and one-half part iron ammonium citrate, said composition having a pH ranging from seven plus to ten.

ANTHONY THOMAS CENTANNI.

REFERENCES CITED

The following references are of record in the file of this patent:

UNITED STATES PATENTS

| Number | Name | Date |
|---|---|---|
| 290,829 | Wikinson | Dec. 25, 1883 |
| 1,227,454 | Kleckner | May 22, 1917 |
| 1,399,007 | Cushman | Dec. 6, 1921 |
| 1,915,884 | Gericke | June 27, 1933 |
| 2,051,460 | Skbensky | Aug. 18, 1936 |
| 2,190,128 | Stone | Feb. 13, 1940 |
| 2,223,316 | Ellis | Nov. 26, 1940 |
| 2,230,931 | Bussert | Feb. 4, 1941 |
| 2,255,027 | Keenen | Sept. 2, 1941 |
| 2,276,234 | Jones | Mar. 10, 1942 |
| 2,279,200 | Keenen | Apr. 7, 1942 |
| 2,318,319 | McDonald | May 4, 1943 |

OTHER REFERENCES

Hackh, "Chemical Dictionary," published 1944, Third Edition, pages 47 and 334, definitions of ammonium chloride and ferri-ammonium citrate.

Culver, "Urinary Antiseptics," published June 1940 in vol. 70 of International Abstract of Surgery, pages 574 through 581 in all; pages 574 and 575 can suffice.